United States Patent Office 2,912,304
Patented Nov. 10, 1959

2,912,304
PROCESS FOR THE PRODUCTION OF AMMONIUM SULFATE

Angel Vian-Ortuno, Conrado Iriarte-Fernandez, and Carlos Melches-Serrano, Madrid, Spain No Drawing. Application April 2, 1956
Serial No. 575,351

Claims priority, application Spain April 23, 1955

14 Claims. (Cl. 23—119)

Most methods which are known to exist and which are used for the production of ammonium sulfate are based upon the neutralization of the sulfuric acid by the ammonia, and therefore they are dependent upon the high costs in the manufacture of sulfuric acid. Huge plants are required in order to render such methods economically profitable and they must fit in with the requirements of the sulfuric acid industry, mainly with respect to its lowest limit of production capacity.

On the other hand, the hitherto proposed methods which do not first produce sulfuric acid, utilize a mixture of sulfur dioxide, ammonia and oxygen (or air)—all in gaseous state—and are devised to the direct production of ammonium sulfate; such methods have been found to be troublesome due to the fact that the yield is low and a certain amount of undesirable ammonium sulfite is also obtained by this way. This requires an additional operation devoted to the oxidation of the ammonium sulfite, or its removal, and the cost of manufacture is increased as a result to such an extent that none of these methods are presently used. The same observations may be made about the various methods in which a gradual conversion of products in several successive stages takes place and one of these products is necessarily ammonium sulfite (or bisulfite). Moreover, the methods using the oxidizing catalytic action of nitrogen oxides in a homogeneous gaseous phase in order to increase the oxidation degree of the product, have also not succeeded because a relatively high concentration of oxides is needed in order to obtain a somewhat effective result.

Other obvious difficulties concerning all methods starting from sulfur dioxide, ammonia, water and oxygen—all of them in a gaseous state—are that no use is made of the high thermal efficiency of the reactions involved, which becomes rather an obstruction, and that operation is performed at low temperatures (always below 100–120° C. and generally about 18–50° C.). As a result the heats of reaction are dissipated and therefore the operation slowly dies and the reacting agents must be mixed with inert gases until certain dilution degrees are attained, which are unwanted in other cases. In all of these methods ammonium sulfite is mainly obtained, which is unstable at temperatures above 120° C., so that the reaction temperature may not be raised and thus the problem of recovering the heats of reaction remains unresolved.

The present invention resolves the production of ammonium sulfate from sulfur dioxide, ammonia, water and oxygen, in such a way that all these difficulties are overcome and an efficient recovery of the produced heat in the process is obtained.

We have found that sulfur dioxide, ammonia, water and oxygen, all in gaseous state, may react together and produce ammonium sulfate free of ammonium sulfite and of other compounds of tetravalent sulfur, when such reaction takes place in the presence of finely divided solid matter in a state of suspension and at adequate temperature and pressure. Besides, the heat of reaction may be recovered in great amount through the vessel walls and be transferred from the waste gases of the process.

The process involves a series of complex consecutive reactions that may be represented, as a whole, by the overall reaction:

$$SO_2 + \tfrac{1}{2}O_2 + H_2O + 2NH_3 \rightarrow (NH_4)_2SO_4 + 125K \text{ cal.} \quad (I)$$

The finely divided solid substance increases the speed of the reaction and leads the process in such way that no ammonium sulfite is produced as would occur in other cases according to the following reaction:

$$SO_2 + H_2O + 2NH_3 \rightarrow (NH_4)_2SO_3 + 65 \text{ K cal.} \quad (II)$$

It has been found to be essential for an optimum catalytic action of the solid substance and for the best heat recovery from reaction (I) to maintain such a solid substance in the so-called turbulent suspension of an upwardly circulating stream of gases and the flow rate of this stream must be in accordance with the dynamic characteristics of the particles. A batch operation may be performed. However a continuous operation is advisable. In this way, the most convenient operating method for the performance of the present invention is achieved by continuously feeding sulfur dioxide, ammonia, oxygen and water, all completely mixed and in vapour phase, through the bottom of the reaction chamber. The size of the reaction chamber is based upon the flow rate of the gases, and this flow rate must be such as to support the granular solid particles located inside the vessel for example, over a perforated plate, in a state of a turbulent suspension, without being massively dragged along by the upward flow of gases. It is in this stage that the partial processes take place when both temperature and pressure reach further disclosed values thus rendering possible in whole the reaction (I). The reaction product, mainly ammonium sulfate, is obtained in a solid state and is drawn out of the reaction chamber by the waste gases, due to its small grain size (microcrystalline powder), and low density. Then it is collected.

The volumetric amount of reacting agents is the theoretically stoichiometric amount; but in practical operation, however, a certain flexibility is possible in carrying out the present invention, the boundaries of flexibility depending on the operating conditions. It must be pointed out in this connection that a slightly higher than stoichiometric amount of oxygen is advisable in order to provide an adequate degree of oxidation of the product, while water, on the other hand, may be used in an amount slightly less than stoichiometric, in which case some additional organic compounds are obtained together with the ammonium sulfate, according to the following general reactions:

$$2SO_2 + O_2 + 2NH_3 \rightarrow (NH_4SO_3)_2NH \quad (III)$$

$$2SO_2 + O_2 + 4NH_3 \rightarrow (NH_4SO_3)_2NH_4 \quad (IV)$$

These are the so-called di- and tri-ammonium imidodisulfonates, which compounds, contrary to ammonium sulfite, are not troublesome with respect to ammonium sulfate, at least with respect to its use as fertilizer because the compounds are also fertilizers by themselves and furthermore they cooperate with ammonium sulfate to a most rapid maturity of flowering plants.

The production of such secondary reactions together with the basic and preferred reaction of the present invention, as well as the extent of such secondary reactions, also depends on the volumetric ratio of sulfur dioxide to ammonia in the reacting mixture. According to the operating conditions, the sulfur dioxide/ammonia ratio may vary within a broad range: it may reach the extreme values of 2 as a maximum and ¼ as a minimum. Moreover, such ratio must always be maintained within such limits, according to the operating conditions, in order to avoid the following reaction, $$SO_2 + \tfrac{1}{2}O_2 + NH_3 \rightarrow NH_4SO_3NH_2 \qquad (V)$$

by which ammonium sulfamate would be obtained which is troublesome for fertilizers due to its herbicidal properties.

It is an essential feature, with respect to the state of the reacting agents inside the reaction chamber that they all remain in a gaseous or vapour state and each one in an adequate amount, and they must pass through the turbulent suspension stage of the granulated solid substance. With respect to the close mixture of the gases, this can be achieved before the inlet which provides introduction into the reaction chamber, or a previous mixing carried out between two or more of the gases, and then the mixture further mixed with the remaining gas. For example, a mixture of the sulfur dioxide and the oxygen can be made, while the other reacting agents are separately introduced into the reaction chamber; or two mixtures, one of ammonia and sulfur dioxide and other of oxygen and water vapour may be introduced into the reaction chamber. It is easy to see that very many variations can be made without changing the basic method.

Some nonreacticing gases, such as nitrogen, may be introduced, if desired, together with the reacting gases, for a better regulation of the reaction turbulence due to its diluent action, and in order to supply aid both in attaining this turbulent suspension of the solid material and in drawing off the end-product. That is why air or oxygen-enriched air or nitrogen-enriched air instead of pure oxygen may be utilized, when desired.

The fine solid material is, in accordance with the present invention, at least partially composed of the so-called "by-contact" catalytic substances (i.e.: $V_2O_5$ over a "support"), in order to increase the speed of the conversion of the reactants into ammonium sulfate. Another action of the catalyst may consist in oxidizing some ammonia to oxides of nitrogen, when the temperature is above 250° C. The presence of such nitrogen oxides is convenient because it has been found that it contributes to the formation of ammonium sulfate. By the procedure of the present invention, a very low amount of such oxides is enough, because of the presence of the solid contact material (around which the reactants are found to be in a higher concentration than in the rest of the homogeneous gas phase). It is very convenient, when operation is performed below 250° C. to introduce such nitrogen oxides or substances able to produce them under the conditions of the process in order to maintain an adequate concentration of such oxides.

Another way to obtain this adequate concentration of nitrogen oxides is by generating them inside the reaction chamber from the elements of air, by means of high voltage discharges.

Another essential task of the granulated solid substance is to serve as a heat-transferring agent from the reaction stage into the walls of the reaction chamber which are coupled with a heat exchanger. It must be emphasized that the solid material must be maintained in a turbulent suspension within the flow of gases in order to warrant a high enough heat-transfer; otherwise the size of the reaction chamber would obviously have to be quite large. The degree of heat transmission depends both on the nature and on the size of the solid material in suspension; that is why other solids such as carborundum or quartzite, although they are chemically inert, may be used together with the catalyst in order to achieve a higher degree of heat transfer degree.

The reaction temperature may be any one running between 18° C. and 450° C., but due to the fact that heat transfer—and therefore heat recovery—increases with the gradient of temperatures, operation below 200° is not advisable. The upper limit of working temperature is given by the stability of ammonium sulfate and by the values of the equilibrium constant of reaction (I). Therefore, a temperature of 450° C. should be reached only if operation takes place at a pressure of some 5 absolute atmospheres, and at higher temperatures, though a much elevated pressure would be obtained, ammonium sulfate would become unstable. Below a temperature of 350° C., however, no overpressure is desired. That is why the preferred range of temperatures runs from 200° to 350° C.

The role of the pressure is a very important one. In fact, if work is performed at temperatures above 350° C., the pressure must be higher than atmospheric, while if work is performed at lower temperatures a lower than atmospheric pressure is advisable. In every case the pressure of operation must have such values that no blocking of the catalyst grains by the solid ammonium sulfate may occur. According to the operating conditions, a range of pressures from 0.1 to 0 absolute atmospheres is generally suitable.

In general, the proper method of operation for the present invention is the so-called continuous one, with a regulated feeding of reacting agents, a regulated removal of the product, an absorption of the heats of reaction and an occasional recirculation of the outlet gases, once the product of the reaction has been previously removed. Such an occasional re-circulation may become necessary when the residence time of the reacting gases in the reaction stage becomes sufficiently short to reach an acceptable yield at once, due to the fact that an indefinite elevation of the residence time may not be accomplished, as is inferred from the characteristics of the invention.

The ways in which any of the gaseous nonreacting components can be saved (i.e. by means of electrofilters, cyclones or other apparatus), as well as the suitable grain size of the suspension solids and the crossing-velocity of the gases through the reaction chamber in order to attain together the necessary suspension state, are not novel, and therefore, they are not detailed here. Neither is the recovery of the heat of reaction and its technique in order to produce water vapour and electric power novel by themselves, so that no details thereof are given here.

The solid catalyst may be continuously or intermittently removed and changed, in view of the property of flowing which is a property of finely divided solids in turbulent state; this is a well-known technique which is widely applied in petroleum "cracking" and other processes, but not for the process described herein.

The above description of the nature of the invention and the way in which it must be operated is sufficient. It must be stressed that the details given above may be modified in detail, without altering the fundamental principles of the invention.

What we claim is:

1. In a method of producing ammonium sulfate free of tetravalent sulfur compounds including ammonium sulfite, the steps of passing gaseous sulfur dioxide, ammonia, water, oxygen and nitrogen oxide into a reaction chamber through a bed of solid particles of predetermined size at a rate adapted to maintain said solid particles in turbulent fluidized state, said solid particles including particles of vanadium pentoxide, whereby a waste gas and microcrystalline particles of ammonium sulfate of a size smaller than said predetermined size of said solid particles are formed and the heat of reaction is absorbed by said solid particles and transferred therefrom to the walls of the reaction chamber; and withdrawing said microcrystalline particles of ammonium sulfate along with said waste gas from said reaction chamber thereby obtaining ammonium sulfate free of tetravalent sulfur compounds.

2. In a method of producing ammonium sulfate free of tetravalent sulfur compounds including ammonium sulfite, the steps of passing gaseous sulfur dioxide, ammonia, water, oxygen and nitrogen oxide into a reaction chamber provided with walls and having a heat exchanger arranged against the walls through a bed of solid particles of predetermined size at a rate adapted to maintain said solid particles in turbulent fluidized state, said solid particles including particles of vanadium pentoxide, whereby a waste gas and microcrystalline particles of ammonium sulfate of a size smaller than said predetermined size of said solid particles are formed and the heat of reaction is absorbed by said solid particles and transferred therefrom to the walls of the reaction chamber and from the walls of the reaction chamber to the heat exchanger from which the heat may be recovered; and withdrawing said microcrystalline particles of ammonium sulfate along with said waste gas from said reaction chamber thereby obtaining ammonium sulfate free of tetravalent sulfur compounds.

3. In a method of producing ammonium sulfate free of tetravalent sulfur compounds including ammonium sulfite, the steps of passing gaseous sulfur dioxide, ammonia, water, oxygen and nitrogen oxide into a reaction chamber through a bed of solid particles of predetermined size at a rate adapted to maintain said solid particles in turbulent fluidized state, said solid particles including particles of a heat carrier selected from the group consisting of carborundum and quartzite and also including particles of vanadium pentoxide as catalytic material adapted to catalyze reaction among said gases, whereby a waste gas and microcrystalline particles of ammonium sulfate of a size smaller than said predetermined size of said solid inert particles are formed and the heat of reaction is absorbed by said solid particles and transferred therefrom to the walls of the reaction chamber; and withdrawing said microcrystalline particles of ammonium sulfate along with said waste gas from said reaction chamber thereby obtaining ammonium sulfate free of tetravalent sulfur compounds.

4. In a method of producing ammonium sulfate free of tetravalent sulfur compounds including ammonium sulfite, the steps of passing gaseous sulfur dioxide, ammonia, water and oxygen into a reaction chamber through a bed of solid particles of predetermined size at a rate adapted to maintain said solid particles in turbulent fluidized state, said solid particles including particles of vanadium pentoxide as catalytic material adapted to catalyze reaction among said gases, and form nitrogen oxides in said reaction chamber, whereby a waste gas and microcrystalline particles of ammonium sulfate of a size smaller than said predetermined size of said solid particles are formed and the heat of reaction is absorbed by said solid particles and transferred therefrom to the walls of the reaction chamber; and withdrawing said microcrystalline particles of ammonium sulfate along with said waste gas from said reaction chamber thereby obtaining ammonium sulfate free of tetravalent sulfur compounds.

5. A process according to claim 1 in which the concentrations of said sulfur dioxide, ammonia, water, oxygen and nitrogen oxides and the rate of reaction are controlled by the addition of an inert gas so that the microcrystalline particles of ammonia sulfate formed are of a size smaller than said predetermined size of said solid particles.

6. A process according to claim 1 in which the concentrations of said sulfur dioxide, ammonia, water, oxygen and nitrogen oxides and the rate of reaction are controlled by the addition of nitrogen gas so that the microcrystalline particles of ammonium sulfate formed are of a size smaller than said predetermined size of said solid particles.

7. In a method of producing ammonium sulfate free of tetravalent sulfur compounds including ammonium sulfite, the steps of passing gaseous sulfur dioxide, ammonia, water, oxygen and nitrogen oxide into a reaction chamber through a bed of solid particles of predetermined size at a rate adapted to maintain said solid particles in turbulent fluidized state, said solid particles including particles of vanadium pentoxide, the amounts of said sulfur dioxide, ammonia, water and oxygen being stoichiometric for the formation of ammonium sulfate, whereby a waste gas and microcrystalline particles of ammonium sulfate of a size smaller than said predetermined size of said solid particles are formed and the heat of reaction is absorbed by said solid particles and transferred therefrom to the walls of the reaction chamber; and withdrawing said microcrystalline particles of ammonium sulfate along with said waste gas from said reaction chamber thereby obtaining ammonium sulfate free of tetravalent sulfur compounds.

8. In a method of producing ammonium sulfate free of tetravalent sulfur compounds including ammonium sulfite, the steps of passing gaseous sulfur dioxide, ammonia, water, oxygen and nitrogen oxide into a reaction chamber through a bed of solid particles of predetermined size at a rate adapted to maintain said solid particles in turbulent fluidized state, said solid particles including particles of vanadium pentoxide, the amounts of said sulfur dioxide, ammonia and water being stoichiometric and the amount of oxygen being slightly higher than stoichiometric for the formation of ammonium sulfate, whereby a waste gas and microcrystalline particles of ammonium sulfate of a size smaller than said predetermined size of said solid particles are formed and the heat of reaction is absorbed by said solid particles and transferred therefrom to the walls of the reaction chamber; and withdrawing said microcrystalline particles of ammonium sulfate along with said waste gas from said reaction chamber thereby obtaining ammonium sulfate free of tetravalent sulfur compounds.

9. In a method of producing ammonium sulfate free of tetravalent sulfur compounds including ammonium sulfite, the steps of passing gaseous sulfur dioxide, ammonia, water, oxygen and nitrogen oxide into a reaction chamber through a bed of solid particles of predetermined size at a rate adapted to maintain said solid particles in turbulent fluidized state, said solid particles including particles of vanadium pentoxide, the amounts of said sulfur dioxide and ammonia being stoichiometric, the amount of water being slightly less than stoichiometric and the amount of oxygen being slightly higher than stoichiometric for the formation of ammonium sulfate, whereby a waste gas and microcrystalline particles of ammonium sulfate of a size smaller than said predetermined size of said solid particles are formed and the heat of reaction is absorbed by said solid particles and transferred therefrom to the walls of the reaction chamber; and withdrawing said microcrystalline particles of ammonium sulfate along with said waste gas from said reaction chamber thereby obtaining ammonium sulfate free of tetravalent sulfur compounds.

10. In a method of producing ammonium sulfate free of tetravalent sulfur compounds including ammonium sulfite, the steps of passing gaseous sulfur dioxide, ammonia, water, oxygen and nitrogen oxide into a reaction chamber through a bed of solid particles of predetermined size at a rate adapted to maintain said solid particles in turbulent fluidized state, said solid particles including particles of vanadium pentoxide, the molar ratio of said sulfur dioxide to said ammonia being between 2 and 0.25, whereby a waste gas and microcrystalline particles of ammonium sulfate of a size smaller than said predetermined size of said solid particles are formed and the heat of reaction is absorbed by said solid particles and transferred therefrom to the walls of the reaction chamber; and withdrawing said microcrystalline particles of ammonium sulfate along with said waste gas from said reaction chamber thereby obtaining ammonium sulfate free of tetravalent sulfur compounds.

11. In a method of producing ammonium sulfate free of tetravalent sulfur compounds including ammonium sulfite, the steps of passing at a temperature between 200 and 450° C. gaseous sulfur dioxide, ammonia, water, oxygen and nitrogen oxide into a reaction chamber through a bed of solid particles of predetermined size at a rate adapted to maintain said solid particles in turbulent fluidized state, said solid particles including particles of vanadium pentoxide, whereby a waste gas and microcrystalline particles of ammonium sulfate of a size smaller than said predetermined size of said solid particles are formed and the heat of reaction is absorbed by said solid particles and transferred therefrom to the walls of the reaction chamber; and withdrawing said microcrystalline particles of ammonium sulfate along with said waste gas from said reaction chamber thereby obtaining ammonium sulfate free of tetravalent sulfur compounds.

12. In a method of producing ammonium sulfate free of tetravalent sulfur compounds including ammonium sulfite, the steps of passing at a temperature between 200 and 450° C. and at a pressure of 0.1–5 atmospheres, higher temperatures being used with higher pressures with a pressure of about 5 atmospheres being used at a temperature of 450° C., gaseous sulfur dioxide, ammonia, water, oxygen and nitrogen oxide into a reaction chamber through a bed of solid particles of predetermined size at a rate adapted to maintain said solid particles in turbulent fluidized state, said solid particles including particles of vanadium pentoxide, whereby a waste gas and microcrystalline particles of ammonium sulfate of a size smaller than said predetermined size of said solid particles are formed and the heat of reaction is absorbed by said solid particles and transferred therefrom to the walls of the reaction chamber; and withdrawing said microcrystalline particles of ammonium sulfate along with said waste gas from said reaction chamber thereby obtaining ammonium sulfate free of tetravalent sulfur compounds.

13. In a method of producing ammonium sulfate free of tetravalent sulfur compounds including ammonium sulfite, the steps of passing at a temperature between 350 and 450° C. and at a pressure above atmospheric and up to 5 atmospheres, higher temperatures being used with higher pressures with a pressure of about 5 atmospheres being used at a temperature of 450° C., gaseous sulfur dioxide, ammonia, water, oxygen and nitrogen oxide into a reaction chamber through a bed of solid particles of predetermined size at a rate adapted to maintain said solid particles in turbulent fluidized state, said solid particles including particles of vanadium pentoxide, whereby a waste gas and microcrystalline particles of ammonium sulfate of a size smaller than said predetermined size of said solid particles are formed and the heat of reaction is absorbed by said solid particles and transferred therefrom to the walls of the reaction chamber; and withdrawing said microcrystalline particles of ammonium sulfate along with said waste gas from said reaction chamber thereby obtaining ammonium sulfate free of tetravalent sulfur compounds.

14. In a method of producing ammonium sulfate free of tetravalent sulfur compounds including ammonium sulfite, the steps of passing at substantially atmospheric pressure and at a temperature of 200–350° C. gaseous sulfur dioxide, ammonia, water, oxygen and nitrogen oxide into a reaction chamber through a bed of solid particles of predetermined size at a rate adapted to maintain said solid particles in turbulent fluidized state, said solid particles including particles of vanadium pentoxide, whereby a waste gas and microcrystalline particles of ammonium sulfate of a size smaller than said predetermined size of said solid particles are formed and the heat of reaction is absorbed by said solid particles and transferred therefrom to the walls of the reaction chamber; and withdrawing said microcrystalline particles of ammonium sulfate along with said waste gas from said reaction chamber thereby obtaining ammonium sulfate free of tetravalent sulfur compounds.

References Cited in the file of this patent

UNITED STATES PATENTS

| | | |
|---|---|---|
| 1,989,124 | Westbrook | Jan. 29, 1935 |
| 2,600,253 | Lutz | June 10, 1952 |

FOREIGN PATENTS

| | | |
|---|---|---|
| 342,524 | Great Britain | Feb. 5, 1931 |